(12) United States Patent
Liu et al.

(10) Patent No.: US 7,727,924 B2
(45) Date of Patent: Jun. 1, 2010

(54) METHOD TO RAISE THE SOLID CONTENT OF CATALYTIC CRACKING CATALYST SLURRY

(75) Inventors: Conghua Liu, Beijing (CN); Zhengguo Tan, Beijing (CN); Wei Ding, Beijing (CN); Shuqin Zheng, Beijing (CN); Xinmei Pang, Beijing (CN); Shuhong Sun, Beijing (CN); Dong Wang, Beijing (CN); Qiuxia Teng, Beijing (CN); Tong Lu, Beijing (CN)

(73) Assignee: Petrochina Company Limited, Beijing (CN)

( * ) Notice: Subject to any disclaimer, the term of this patent is extended or adjusted under 35 U.S.C. 154(b) by 87 days.

(21) Appl. No.: 11/846,080

(22) Filed: Aug. 28, 2007

(65) Prior Publication Data

US 2008/0058197 A1 Mar. 6, 2008

(30) Foreign Application Priority Data

Aug. 30, 2006 (CN) ......................... 2006 1 0112684

(51) Int. Cl.
*B01J 29/06* (2006.01)
(52) U.S. Cl. .............................. 502/60; 502/63; 502/64; 502/68
(58) Field of Classification Search .................. 502/60, 502/63, 64, 68
See application file for complete search history.

(56) References Cited

U.S. PATENT DOCUMENTS 4,443,553 A 4/1984 Chiang 4,476,239 A 10/1984 Chiang

FOREIGN PATENT DOCUMENTS

CN 87106816.8 4/1989

OTHER PUBLICATIONS

English translation of CN 1119390A, Jiaqing et al, pp. 1-23, Aug. 2003.*
Translation of CN 1098130, Yukang et al.*
English Abstract of Chinese Application No. 87106816.8.

* cited by examiner

*Primary Examiner*—Elizabeth D Wood
(74) *Attorney, Agent, or Firm*—Conley Rose, P.C.

(57) ABSTRACT

A method for preparing cracking catalyst. The method comprises making catalyst slurry having a homogeneous distribution of molecular sieve slurry, pseudoboehmite, clay, inorganic acid and aluminum-containing binder; and subsequent spray drying. Inorganic acid is added prior to the addition of pseudoboehmite; addition of molecular sieve is added after the addition of inorganic acid; and a phosphatic dispersant is added during preparation. Compared to conventional methods of preparing FCC catalyst slurry, the inventive catalyst slurry viscosity is decreased and the fluidity thereof is improved, while catalyst anti-friction is maintained. The solid content of the FCC catalyst slurry can be increased to about 40% or more. The gel forming time is significantly reduced with increased productivity and decreased catalyst production cost. Meanwhile, the catalyst has high pore volume and improved micro-reactivity. Overall reactivity performance of the catalyst is also improved.

22 Claims, No Drawings

METHOD TO RAISE THE SOLID CONTENT OF CATALYTIC CRACKING CATALYST SLURRY

CROSS-REFERENCE TO RELATED APPLICATIONS

This application claims priority to China application Serial No. CN.200610112684.X, filed on Aug. 30, 2006 and incorporated herein by reference in its entirety for all purposes.

STATEMENT REGARDING FEDERALLY SPONSORED RESEARCH OR DEVELOPMENT

Not Applicable.

BACKGROUND OF THE INVENTION

1. Field of the Invention

The present disclosure relates to a method for increasing the solid content of catalytic cracking catalyst slurry, which is suitable for preparation of catalytic cracking catalyst in petroleum processing. The method may be used to significantly boost the solid content of a catalyst slurry during catalyst preparation.

2. Background of the Invention

Fluidized Catalytic Cracking (abbreviated as FCC) is a major component in the secondary processing of crude oil. Deep processing of heavy oil via FCC is an important means for manufacturing vehicle fuel both at home and abroad. Due to increasing densification and degeneration of raw materials available for processing along with the rising demand for vehicle fuel, the consumption of FCC catalyst continually increases. Meanwhile, due to the requirement of heavy oil processing and FCC technology development, the proportion of molecular sieve active component in FCC catalyst has tended to increase. Generally the technological process for preparing semisynthetic FCC catalyst is to make a slurry of adhesives (such as aluminum collosol), pseudoboehmite, clay, inorganic acid and molecular sieve, etc., and then obtain catalyst product by spray molding and post treatment. Presently, there are such problems in the preparation methods as low colloid solid content before spray molding, and non-uniform mixing of molecular sieve active component and other components (called matrix components), etc. These problems result in high cost of catalyst production, uneven particle size of molded microbeads, poor sphericity and/or inadequate thermostability of active catalyst center such that molecular sieves of the catalyst fail to enable top catalyst reaction performance. According to conventional preparation processes, an increase of the solid content of the catalyst slurry will result in a much higher viscosity of the slurry, which leads to delivery difficulties and less desirable anti-friction of the catalyst. These slurries, therefore, may not satisfy utilization requirements.

The prior art discloses various processes which address these problems. For example, U.S. Pat. No. 4,476,239 and U.S. Pat. No. 4,443,553 disclose a method for preparing a cracking catalyst. The method is characterized in that a dispersant of $[Al_2(OH)_{6-y}Cl_y]_x$ or $Al_2(OH)_5NO_3$ is added to the catalyst slurry to reduce the visciscity thereof and to increase the solid content of the sprayed catalytic slurry. According to these patents, in the absence of dispersants, the catalyst slurry containing aluminum base binder, clay, silicon source and molecular sieve has a solid content in a range of 20%~25%, while, after the addition of the said dispersants, the solid content can reach 30%. The disclosed preparation procedure is: water→pseudoboehmite→acidification→kaolin→molecular sieve→ammonium polysilicate→dispersant→beating to homogeneous→spray drying.

China Patent No. CN 1032498A introduces a method for preparation of semisynthetic fluid catalytic cracking catalyst, wherein, before drying the catalyst, PAM (polyacrylamide) with molecular weight of 2,500,000-5,000,000 units in an amount of 0.01%~0.15% based on dry catalyst basis is added into the sprayed slurry as a dispersant. In this way, viscosity of the catalyst slurry can decrease 10%~50% and catalyst output can increase without adversely influencing catalyst performance.

China Patent No. CN1081219C discloses a process to raise the solid content of a sprayed catalyst slurry. The process includes beating the molecular sieve slurry, aluminum collosol, pseudoboehmite, clay and inorganic acid. The process is characterized by the addition of molecular sieve prior to the addition of clay and inorganic acid; inorganic acid addition following addition of aluminum collosol; and preferable addition of the inorganic acid after the addition of aluminum collosol and pseudoboehmite. The method can increase the solid content of the catalyst slurry before spray drying.

China Patent No. CN1081218C also discloses a process to raise the solid content of a sprayed catalyst slurry. The process includes beating the molecular sieve slurry, aluminum collosol, pseudoboehmite, clay and inorganic acid so as to obtain a solid content of 25%~45% in the slurry. The process is characterized by addition of aluminum collosol prior to the addition of clay and inorganic acid; addition of molecular sieve slurry after the addition of inorganic acid; and preferable addition of inorganic acid after addition of aluminum collosol and pseudoboehmite. This method may also increase the solid content of the catalyst slurry before spray drying.

China Patent No. CN1160436C discloses a method for preparing a cracking catalyst. The method includes beating the molecular sieve slurry, pseudoboehmite, clay and inorganic acid to homogeneity, with or without the addition of aluminum collosol, to obtain a catalyst slurry. The slurry is then spray dried. The method is characterized by the addition of a quantity of inorganic acid into a collosol of pseudoboehmite, the quantity depending upon the viscosity of the catalyst slurry. The method provided by this patent can avoid the changes of catalyst intensity and pore volume that results from unstable acid consumption by pseudoboehmite.

China Patent No. CN1119390C discloses a process to raise the solid content of a sprayed catalyst slurry. In this process, molecular sieve and/or aluminum collosol are added prior to the addition of clay and inorganic acid; inorganic acid is added after the addition of aluminum collosol, preferably, the inorganic acid is added after the addition of aluminum collosol and pseudoboehmite. There is no particular requirement for the addition sequence of the other materials. Furthermore, a dispersant such as ammonium phosphate, ammonium dihydrogen phosphate, diammonium hydrogen phosphate (DAP; or ammonium phosphate, dibasic) or a mixture thereof is added into the spray slurry so as to significantly increase the solid content and shorten the gel forming time.

Currently, the preparation of FCC catalyst of collosol aluminum complex binder comprises acidification of pseudoboehmite. The production process introduced in both domestic and overseas patent reports adopts the technical procedure of adding acid subsequent to addition of pseudoboehmite (e.g. U.S. Pat. No. 4,476,239; China Patent Nos. 1081218C and 1098130A, etc.). According to current acidification methods, catalyst slurry so prepared may have a solid content within 25%~50%. One of the more prominent problems at the moment is that, because the inorganic acid is added after the addition of pseudoboehmite, the reaction between the inorganic acid and the pseudoboehmite is difficult to conduct homogeneously. Thus, excessive reaction is present in some regions and this leads to rapid increase of the slurry viscosity. A second prominent problem is the previously inevitable partial damage to the molecular sieve when inorganic acid is added after the addition of molecular sieve slurry. Concurrently, because system acidity cannot be adequately controlled at a low level (generally pH less than 2.8), it is difficult to fine the pseudoboehmite. In instances where the molecular sieve content is high (for instance, greater than 40%), the anti-friction of the catalyst is reduced and catalyst utility is significantly adversely affected.

Accordingly, there is a need for a new method of FCC catalyst preparation that raises the solid content in the spayed slurry, produces a uniform mixture of molecular sieves and matrix components, and shortens the preparation of FCC catalyst. Such a method will enhance the production efficiency and improve the catalyst performance. The method should retain or improve the anti-friction performance and the reactivity of the catalyst.

SUMMARY OF THE INVENTION

Embodiments of the present disclosure provide a method for the preparation of FCC catalyst. The disclosed method increases the solid content of the catalyst slurry before spraying and simultaneously maintains anti-friction and reactivity performance of the catalyst. The method enables efficient FCC catalyst production, and may decrease energy consumption and costs associated therewith.

The method for increasing the solid content of catalytic cracking catalyst slurry, comprises making catalyst slurry by mixing to make homogeneous a clay, molecular sieve slurry, aluminum-containing binder, a pseudoboehmite, and an inorganic acid, said method comprising: (1) adding the inorganic acid before the addition of pseudoboehmite, and adding the molecular sieve after the addition of inorganic acid; and (2) adding a phosphorus-containing dispersant into the process, wherein the dispersant is a phosphoric acid and/or phosphate added in an amount of from about 0.05% to about 6% based on the dry weight basis of the catalyst. In embodiments, the inorganic acid is added after the addition of clay and aluminum-containing binder.

In embodiments of the method, inorganic acid and aluminum-containing binder are combined and mixed to make homogeneous prior to addition of the other components.

In embodiments, the phosphorus-containing dispersant is selected from one or more of diammonium hydrogen phosphate, phosphoric acid, sodium hexametaphosphate, sodium pyrophosphate and combinations thereof. In embodiments, the phosphorus-containing dispersant is added in an amount of from about 0.1% to about 4%.

In embodiments, based on the dry basis by weight of the catalyst slurry, the catalyst slurry comprises from about 15% to about 50% of molecular sieve, from about 15% to about 60% of clay, from about 8% to about 30% of pseudoboehmite, and from about 3% to about 18% of aluminum-containing binder according to aluminum oxide.

In embodiments, the weight ratio between the inorganic acid and the aluminum oxide in pseudoboehmite is in the range of from about 0.01 to about 0.32.

In embodiments, the catalyst slurry further comprises between 0% and about 8 wt % of at least one oxide or precursor of an oxide selected from the group consisting of rare earth oxides, zinc oxide, silicon oxide, magnesia, titanium oxide, vanadium oxide, copper oxide, precursors thereof, and combinations thereof. In embodiments, the catalyst slurry comprises at least one oxide or precursor of an oxide selected from rare earth oxides, silicon oxide, precursors thereof and combinations thereof.

The molecular sieve may be selected from the group consisting of Y-type zeolites and mixtures of at least one Y-type zeolite with at least one zeolite selected from the group consisting of ZSM zeolite, β zeolite, Ω zeolite, MCM zeolite, SAPO zeolite, and combinations thereof. In some embodiments, the molecular sieve comprises a mixture of Y-type zeolite and ZSM-5 zeolite. In some embodiments, the Y-type zeolite is a modified Y-type zeolite. In embodiments, the Y-type zeolite is selected from the group consisting of HY, $NH_4Y$, REY, USY, REUSY, and combinations thereof.

The clay may be selected from the group consisting of kaolin, meerschaum, allokite, polynite, and combinations thereof. In embodiments, the clay is selected from the group consisting of kaolin, allokite and mixtures thereof. In embodiments, the clay comprises kaolin.

The pseudoboehmite may be selected from the group consisting of boehmite, hydrargillite, bayerite, and combinations thereof. In embodiments, the pseudoboehmite comprises boehmite.

The inorganic acid may be selected from the group consisting of hydrochloric acid, sulfuric acid, nitric acid, and phosphoric acid. In embodiments, the inorganic acid is hydrochloric acid.

The aluminum-containing binder may be selected from the group consisting of aluminum collosol, aluminum chlorhydroxide, acid modified kaolin, and combinations thereof. In embodiments, the aluminum-containing binder is selected from the group consisting of: (1) aluminum-containing binders obtained from the reaction of metallic aluminum with hydrochloric acid or aluminum chloride; (2) aluminum-containing binders obtained from the pyrolysis process of crystalline aluminum chloride; (3) aluminum-containing binders obtained from the reaction of inorganic acid with kaolin or torrefied kaolin; and (4) aluminum-containing binders obtained from the reaction of hydrochloric acid and aluminum hydroxide under elevated pressure.

Also disclosed herein are catalytic cracking catalyst slurries prepared by the disclosed methods.

DETAILED DESCRIPTION OF THE PREFERRED EMBODIMENTS

The method to increase the solid content of an FCC catalyst slurry according to the present disclosure comprises: beating and mixing to make homogeneous clay, molecular sieve slurry, aluminum-containing binder, pseudoboehmite and inorganic acid to obtain a catalyst slurry, and then spray drying. The method is characterized by: (1) addition of inorganic acid prior to addition of pseudoboehmite, and addition of molecular sieve after the addition of inorganic acid; preferably, addition of the inorganic acid is after the additions of kaolin and aluminum-containing binder; addition of other materials proceeds without any particularly limited sequence; and (2) addition of a phosphor-containing dispersant during preparation of the FCC catalyst, which dispersant may comprise a phosphoric acid and/or a phosphate, in an amount of from about 0.05% to about 6% by weight based on the dry weight of the catalyst. The introduction of dispersant serves to further reduce the viscosity of the catalyst slurry. Compared with prior art methods, the method herein disclosed may significantly increase the solid content of an FCC catalyst slurry, shorten the gel forming time and/or reduce the production cost. These improvements may be attained while simultaneously ensuring sufficient anti-friction and reactivity performance of the catalyst.

FCC catalyst slurry with high solid content according to the present disclosure comprises (based on a dry weight basis) from about 15% to about 50% of molecular sieve, from about 15% to about 60% of clay, from about 8% to about 30% of pseudoboehmite, and from about 3% to about 18% of aluminum-containing binder (calculated as aluminum oxide). In embodiments, the weight ratio between the inorganic acid and the aluminum oxide in the pseudoboehmite is in the range of from about 0.01 to about 0.32. In embodiments, the solid content in the slurry is in the range of from about 25% to about 45%.

The catalyst slurry comprises one or more phosphatic dispersant. In embodiments, the phosphatic dispersant is selected from the group consisting of DAP, phosphoric acid, sodium hexametaphosphate, sodium pyrophosphate, and combinations thereof. In some preferred embodiments, the phosphatic dispersant comprises DAP. In embodiments, the phosphatic dispersant is added in an amount of from about 0.05% to about 6% based on the dry weight of the catalyst. In some preferred embodiments, the phosphatic dispersant is added in an amount of from about 0.1% to about 4% based on the dry weight of the catalyst.

The catalyst slurry comprises from about 0% to about 8% of one or more oxide(s) selected from the group consisting of rare earth oxides, zinc oxide, silicon oxide, magnesia, titanium oxide, vanadium oxide, copper oxide, and combinations thereof. In embodiments, the catalyst slurry comprises from about 0% to about 8% of one or more precursor(s) of an oxide selected from the group consisting of rare earth oxides, zinc oxide, silicon oxide, magnesia, titanium oxide, vanadium oxide, copper oxide, and combinations thereof. In preferred embodiments, the catalyst slurry comprises at least one oxide selected from the group consisting of rare earth oxides, silicon oxide, and combinations thereof. In embodiments, the catalyst slurry comprises at least one precursor of an oxide selected from the group consisting of precursors of rare earth oxides, precursors of silicon oxide, and combinations thereof.

The molecular sieve slurry of the present disclosure comprises molecular sieve. Suitable molecular sieves according to this disclosure are Y-type zeolites (including various modified Y-type zeolites), and mixtures of Y-type zeolite(s) with one or more zeolite selected from the group consisting of ZSM zeolite, β zeolite, Ω zeolite, MCM zeolite, SAPO zeolite, and combinations thereof. In preferred embodiments, the molecular sieve slurry comprises Y-type zeolite or a mixture of Y-type zeolite with ZSM-5 zeolite. In embodiments, the molecular sieve slurry comprises modified Y zeolite selected from the group consisting of HY, $NH_4Y$, REY, USY, REUSY, Y-type zeolites modified by other element(s), and mixtures thereof.

The catalyst slurry of the present disclosure comprises clay. In embodiments, the clay is selected from the group consisting of kaolin, meerschaum, allokite, polynite, and mixtures thereof. In some preferred embodiments, the clay is selected from the group consisting of kaolin, allokite, and mixtures thereof. In specific most preferred embodiments the clay comprises kaolin.

The catalyst slurry of the present disclosure comprises pseudoboehmite. In embodiments, the pseudoboehmite is selected from the group consisting of boehmite, hydrargillite, bayerite, and combinations thereof. In some preferred embodiments, the pseudoboehmite comprises boehmite.

The catalyst slurry of the present disclosure comprises aluminum-containing binder. In embodiments, the aluminum binder comprises aluminum collosol, basic aluminum chloride (aluminum chlorhydroxide), and/or acid modified kaolin. Acid modified kaolin may be formed via various methods, including: (1) reaction of metallic aluminum with hydrochloric acid (or aluminum chloride); (2) pyrolysis process of crystalline alumina (e.g. aluminum chloride); (3) reaction of inorganic acid with kaolin, roasted kaolin or a combination thereof, and (4) other methods, e.g. reaction of hydrochloric acid with aluminum hydroxide under elevated pressure.

The catalyst slurry of the present disclosure comprises inorganic acid. Suitable inorganic acids are hydrochloric acid, sulfuric acid, nitric acid, and phosphoric acid. In embodiments, the inorganic acid comprises hydrochloric acid.

In a preferred embodiment according to the present disclosure, the solid content of the FCC catalyst slurry is increased by adding inorganic acid after the addition of clay and/or aluminum-containing binder. For example, in embodiments, aluminum-containing binder and a desired amount of water are introduced into a reactor. Clay and inorganic acid are next added to the reactor. After stirring to make homogeneous, pseudoboehmite is added which causes a moderate reaction. Following the reaction, dispersant is added. Penultimately, molecular sieve slurry is added to the reactor and the slurry is stirred to homogenize. Finally, the resultant slurry is spray dried.

In an alternative preferred embodiment, clay and a desired amount of water are introduced into a reactor. Inorganic acid is then added to the reactor. After stirring to make homogeneous, pseudoboehmite is then added to make a moderate reaction. The molecular sieve slurry and aluminum-containing binder are then introduced. Following stirring to homogeneity, dispersant is added and the slurry stirred to make homogeneous. The resultant slurry is then spray dried.

In still another preferred embodiment, inorganic acid and aluminum-containing binder are combined and stirred to make homogeneous. Other components are then introduced. For example, in embodiments, aluminum collosol and inorganic acid are firstly stirred to make homogeneous. Clay and deionized water are then added and the slurry homogenized (e.g., by stirring). Pseudoboehmite is then added to make a moderate reaction. Subsequently, molecular sieve slurry is added, again stirring to make homogeneous. Lastly, dispersant is added. The resulting slurry is then spray dried.

The preparation method according to the present disclosure does not exclude any technical embodiments meeting the spirit of the invention but not specifically disclosed in the foregoing or following exemplary, but not limited, embodiments.

For a semisynthetic FCC catalyst comprising pseudoboehmite and aluminum-containing binder, the existing form of the pseudoboehmite is a determining factor for the solid content of the catalyst slurry as well as for the anti-friction of the catalyst. Thus, controlling the existing form of the pseudoboehmite is a key to improving the performance of the catalyst slurry. The existing form of the pseudoboehmite is determined by its reaction with inorganic acid. Upon the addition of inorganic acid, the pseudoboehmite reacts with the inorganic acid, rapidly increasing the viscosity and impairing the fluidity of the catalyst slurry.

In the method of the present disclosure, inorganic acid is added to the catalyst slurry prior to addition of pseudoboehmite, while molecular sieve is added after the addition of inorganic acid. In preferred embodiments, inorganic acid is added after the addition of clay and aluminum-containing binder. Because the clay and the inorganic acid may react with one another well when added first, the clay is modified so as to improve the porous structure of the matrix and the catalytic activity. Because of a certain amount of acid being consumed by the reaction of inorganic acid with clay, the system acidity decreases and, due to homogenizing, is uniform. Thus, when pseudoboehmite is duly added, the reaction between the pseudoboehmite and the inorganic acid occurs moderately and in an orderly manner and reaction occurs homogeneously, so as to avoid rapid increases of the system viscosity which could result from topically excess reactions of pseudoboehmite with inorganic acid. The solid content of the slurry can thus be significantly increased while simultaneously ensuring the anti-friction of the catalyst. In order to improve the fluidity of the catalyst slurry, a dispersant may be duly added during the preparation of the FCC catalyst, to reduce the viscosity of the catalyst slurry.

The method of catalyst preparation herein disclosed allows gradual alteration of system pH, minimizing/avoiding damage to the molecular sieve component which is subsequently added. Furthermore, low viscosity and fine fluidity facilitate homogeneous mixing, which allows the active component of molecular sieve to perform sufficiently. Because there is no need to increase pH by heating and aging the slurry, the disclosed method improves the existing form of pseudoboehmite colloidal particles, which is favorable to a lower viscosity. Therefore, compared with conventional methods of the prior art, the method according to the present disclosure can significantly increase the efficiency of production of FCC catalyst, improve the performance of FCC catalyst, and/or reduce the energy consumption and costs of producing the catalyst.

EXAMPLES

The examples listed below are given to further explain the invention. The Examples are not intended to limit the protected scope of the invention.

In each example described hereinbelow, a Cole Parmer rotational viscometer (98936-15) was used to measure the viscosity. The viscosity measurement parameters were: a speed of rotation of 20 rpm and a shaft of R4. The physical and chemical properties of the resultant catalysts were measured as described in Table 1.

Raw materials used in the Examples:
1. 1# pseudoboehmite (Shandong origin, loss on ignition 39.6%), 2# pseudoboehmite (Shanxi origin, loss on ignition 40.4%), kaolin (loss on ignition 25.4%), allokite (loss on ignition 19.2%), aluminum collosol (aluminum oxide content 23.0%), acid treated kaolin (solid content 28.1%). All of these products are qualified industrial products derived from Lanzhou Petrochemical Corporation Catalyst Plant.
2. USY molecular sieve (loss on ignition 4.8%, crystal cell parameter $a_o$ 2.452 nm), REUSY molecular sieve (loss on ignition 5.3%, oxidized rare earth 8.5%, crystal cell parameter $a_o$ 2.462 nm), REY (loss on ignition 4.4%, oxidized rare earth 18.1%). All these molecular sieves are qualified industrial products derived from Lanzhou Petrochemical Corporation Catalyst Plant. High silicon ZSM-5 (loss on ignition 5.1%, silicon-aluminum ratio greater than 300), also a qualified product produced by Shanghai Fudan University. Low silicon ZSM-5 (loss on ignition 4.8%, silicon-aluminum ratio 38) produced by Nankai University; β zeolite (loss on ignition 5.6%, silicon-aluminum ratio 30) provided by China University of Petroleum; phosphoric acid, sodium hexametaphosphate, DAP and sodium pyrophosphate (chemically pure) from Xi' an Reagent Plant.

TABLE 1

Catalyst Analysis and Evaluation Methods

| Items | Methods | Standard No. |
| --- | --- | --- |
| Pore volume mL · g$^{-1}$ | Water titration | Q/SYLS 0521-2002 |
| Abrasion index m % | Air lift | Q/SYLS 0518-2002 |
| Micro-activity (4 hours) m % | Reaction in micro fixed-bed | Q/SYLS 0589-2002 |
| Reactive selectivity | Reaction in fixed fluidized bed | Q/SYLS 0641-2002 |
| Gasoline octane number | Chromatography | M213·02-07-2003 |
| Gasoline constituents v % | Chromatography | Software from Research Institute of Petroleum Processing, Beijing |

Example 1

Quantities of 1140 g of deionized water, 2174 g of aluminum collosol and 2078 g of kaolin were introduced into a reactor. After beating for 10 minutes, 200 g of hydrochloric acid with a concentration of 35% was added. After mixing to make homogeneous, 1656 g of 1# pseudoboehmite was added under stirring. Following 1 hour of stirring, 75 g of DAP as dispersant was introduced. After 30 minutes of stirring, 1937 g of REUSY molecular sieve with an average particle diameter of less than 5 microns treated by colloid mill, and a molecular sieve slurry comprising 123 g of Fudan ZSM-5 molecular sieve and 3510 g of deionized water were added. After beating for 30 minutes, spray drying was conducted to obtain catalyst microspheres. The obtained catalyst microspheres were torrefied at 500° C. for 30 minutes. Next, an 8-fold volume of deionized water was added to the torrefied catalyst microspheres and the mixture was stirred to make homogeneous. After a 15 minute wash at 80° C. followed by filtration and drying, an FCC catalyst according to the present disclosure was obtained. This catalyst was recorded as catalyst A1.

The sprayed slurry of catalyst A1 had a solid content of 39.2 wt % and a viscosity of 4058 centipoise. The obtained A1 catalyst had a abrasion index of 1.5, a pore volume of 0.40 mL·g$^{-1}$ and a micro-reactivity of 79.

Example 2

Quantities of 2262 g of deionized water and 2078 g of kaolin were introduced into a reactor. After beating for 10 minutes, 230 g of hydrochloric acid with a concentration of 35% was added. After mixing homogeneously, 1656 g of 1# pseudoboehmite was added while stirring. Following 1 hour of stirring, 72 g of phosphoric acid was introduced as dispersant. After 30 minutes of stirring, a molecular sieve slurry comprising 2060 g of REUSY molecular sieve with an average particle diameter of less than 5 microns treated by colloid mill, and 2174 g of aluminum collosol and 2388 g of deionized water were added. 36 g of DAP as a dispersant was then added following a further agitation for 1 hour. After beating for 30 minutes, spray drying was conducted to obtain catalyst microspheres. The obtained catalyst microspheres were torrefied at 500° C. for 30 minutes, an 8-fold volume of deionized water was then added, and the mixture was stirred to make homogeneous. After a 15 minute wash at 80° C. followed by filtration and drying, an FCC catalyst according to the present disclosure was obtained. This catalyst was recorded as catalyst A2.

The sprayed slurry of catalyst A2 had a solid content of 39.0 wt % and a viscosity of 4856 centipoise. The obtained A2 catalyst had an abrasion index of 1.7, a pore volume of 0.41 mL·g$^{-1}$ and a micro-reactivity of 80.

Comparative Example 1

The present comparative example shows the results of an FCC catalyst prepared by the method according to China Patent No. CN 1081218C.

Quantities of 2174 g of aluminum collosol and 1140 g of deionized water were introduced into a reactor. 1656 g of 1# pseudoboehmite was added under stirring. After beating for 20 minutes, 2078 g of kaolin was added. Following 40 minutes of stirring and beating, 305 g hydrochloric acid with a concentration of 22% was added. After 30 minutes of stirring, a molecular sieve slurry comprising 1937 g of REUSY molecular sieve with an average particle diameter of less than 5 microns treated by colloid mill, and 123 g of Fudan ZSM-5 molecular sieve and 3510 g of deionized water was added. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst was obtained. This catalyst was recorded as catalyst B1.

The sprayed slurry of catalyst B1 had a solid content of 38.8 wt % and a viscosity of 6506 centipoise. The obtained B1 catalyst had an abrasion index of 2.7, a pore volume of 0.40 mL·g$^{-1}$ and a micro-reactivity of 77. The data showed that the viscosity of the B1 catalyst slurry was high while improving the solid content, and in practical production, the anti-friction index of the B1 catalyst may also be rather high.

Comparative Example 2

The present comparative example shows the effect of an FCC catalyst comprising the same raw material components of Example 1, but made by the preparation method according to China Patent No. ZL93109101.2.

The deionized water and 2078 g of kaolin were introduced into a reactor. After beating for 30 minutes, 230 g hydrochloric acid with a concentration of 35% was added to the reactor. After stirring to make homogeneous and reacting for 1 hour, 1656 g of 1# pseudoboehmite was added while stirring. Following 30 minutes of stirring, the temperature was elevated to 70° C. for aging for 1 hour, and then 2174 g of aluminum collosol was added. After 20 minutes of stirring, a mixed slurry consisting of 2060 g of REUSY molecular sieve and deionized water was added. After further beating, spray drying was conducted to obtain catalyst microspheres. The obtained catalyst microspheres were torrefied at 500° C. for 30 minutes, the deionized water was added, and the mixture was stirred again to make homogeneous. After a 15 minute wash at 80° C. followed by filtration and drying, an FCC catalyst was obtained. This catalyst was recorded as catalyst B2.

The sprayed slurry of catalyst B2 had a solid content of 39.0 wt % and a viscosity of 7652 centipoise. The obtained B2 catalyst had an abrasion index of 2.2, a pore volume of 0.40 mL·g$^{-1}$ and a micro-reactivity of 77. The data showed that for the obtained B2 catalyst with high solid content, the slurry thereof was of high viscosity and poor fluidity, which increased the difficulty of processing; meanwhile, due to the high viscosity of the slurry, the mixing between the molecular sieve and matrix was not uniform, which resulted in a somewhat low micro-reactivity of the B2 catalyst.

Comparative Example 3

The present comparative example shows the effect of an FCC catalyst prepared by the method according to China Patent No. CN 1180062C.

A mixed slurry consisting of 2060 g of REUSY molecular sieve and 4850 g of deionized water was introduced into a reactor. Then 2174 g of aluminum collosol was added to the reactor. Next, 2078 g of kaolin was added while stirring. After beating for 15 minutes, 1656 g of 1# pseudoboehmite was added. Following 20 minutes of stirring, 305 g of hydrochloric acid with a concentration of 22% was added to the reactor. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst was obtained. This catalyst was recorded as catalyst B3.

The sprayed slurry of catalyst B3 had a solid content of 38.2 wt % and a viscosity of 4011 centipoise. The obtained B3 catalyst had an abrasion index of 3.3, a pore volume of 0.41 mL·g$^{-1}$ and a micro-reactivity of 76. The data show that, using this method, when the content of molecular sieve in the B3 catalyst is high to improve the solid content of the B3 catalyst slurry, the anti-friction index of the B3 catalyst is high, and the micro-reactivity of the B3 catalyst is relatively low.

Example 3

Quantities of 700 g of deionized water, 2174 g of aluminum collosol, 1280 g of kaolin and 550 g of allokite were introduced into a reactor. After beating for 10 minutes, 200 g of hydrochloric acid with a concentration of 25% was added. After mixing to make homogeneous, 1904 g of 1# pseudoboehmite was added under stirring. After 30 minutes of stirring, a molecular sieve slurry comprising 1860 g of REUSY molecular sieve with an average particle diameter of less than 5 microns treated by colloid mill, and 100 g of Fudan ZSM-5 and 2905 g of deionized water was added. A quantity of 69 g of DAP was then added as a dispersant following a further agitation for 1 hour. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst according to the present disclosure was obtained. This catalyst was recorded as catalyst A3.

The sprayed slurry of catalyst A3 had a solid content of 41.8 wt % and a viscosity of 6032 centipoise. The obtained A3 catalyst had an abrasion index of 1.9, a pore volume of 0.42 mL·g$^{-1}$ and a micro-reactivity of 78.

Example 4

Quantities of 1140 g of deionized water, 2174 g of aluminum collosol and 2078 g of kaolin were introduced into a reactor. After beating for 10 minutes, 230 g of hydrochloric acid with a concentration of 35% was added. After mixing to make homogeneous, 1656 g of 1# pseudoboehmite was added under stirring. After 30 minutes of stirring, 145 g of a rare earth (RE) chloride with a concentration of 22% (calculated for $RE_2O_3$) was added. After further agitation for 5 minutes, a molecular sieve slurry comprising 1570 g of REUSY molecular sieve with an average particle diameter of less than 5 microns treated by colloid mill, and 398 g of REY, 102 g of beta-zeolite and 3510 g of deionized water was added. A quantity of 102 g of sodium pyrophosphate as a dispersant was then added following a further agitation for 1 hour. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst according to the present disclosure was obtained. This catalyst was recorded as catalyst A4.

The sprayed slurry of catalyst A4 had a solid content of 38.8 wt % and a viscosity of 4589 centipoise. The obtained A4 catalyst had an abrasion index of 1.6, a pore volume of 0.40 $mL \cdot g^{-1}$ and a micro-reactivity of 80.

Example 5

Quantities of 1140 g of deionized water, 2174 g of aluminum collosol and 2078 g of kaolin were introduced into a reactor. After beating for 10 minutes, 100 g of phosphoric acid with a concentration of 80% was added. Following 5 minutes of agitation, 125 g of hydrochloric acid with a concentration of 35% was added. After mixing to make homogeneous, 1656 g of 1# pseudoboehmite was added under stirring. After 30 minutes of stirring, a molecular sieve slurry comprising 984 g of USY molecular sieve with an average particle diameter of less than 5 microns treated by colloid mill, and 986 g of REY, 102 g of Nankai ZSM-5 zeolite and 3510 g of deionized water was added. A quantity of 58 g of phosphoric acid as a dispersant was then added following a further agitation for 1 hour. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst according to the present disclosure was obtained. This catalyst was recorded as catalyst A5.

The sprayed slurry of catalyst A5 had a solid content of 39.0 wt % and a viscosity of 5078 centipoise. The obtained A5 catalyst had an abrasion index of 1.3, a pore volume of 0.37 $mL \cdot g^{-1}$ and a micro-reactivity of 79.

Example 6

Quantities of 506 g of deionized water, 3201 g of aluminum collosol and 1676 g of kaolin were introduced into a reactor. After beating for 10 minutes, 150 g of hydrochloric acid with a concentration of 35% was added to the reactor. After mixing to make homogeneous, 1240 g of 1# pseudoboehmite was added under stirring. A quantity of 60 g of sodium pyrophosphate was then added following an agitation of 1 hour. After 30 minutes of stirring, 100 g of zinc nitrate ($Zn(NO_3)_2 \cdot 6H_2O$) was introduced. Following 25 minutes of agitation, a molecular sieve slurry comprising 2270 g of REUSY molecular sieve with an average particle diameter of less than 5 microns treated by colloid mill, and 3510 g of deionized water was added. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst according to the present disclosure was obtained. This catalyst was recorded as catalyst A6.

The sprayed slurry of catalyst A6 had a solid content of 38.9 wt % and a viscosity of 3568 centipoise. The obtained A6 catalyst had an abrasion index of 1.9, a pore volume of 0.35 $mL \cdot g^{-1}$ and a micro-reactivity of 82.

Example 7

Quantities of 3614 g of deionized water, 1087 g of aluminum collosol, 72 g of sodium hexametaphosphate, 1204 g of acid-treated kaolin and 2680 g of kaolin were introduced into a reactor. After beating for 10 minutes, 88 g of hydrochloric acid with a concentration of 20% was added. After mixing to make homogeneous, 1656 g of 2# pseudoboehmite was added under stirring. After 30 minutes of stirring, a molecular sieve slurry comprising 1585 g of REUSY molecular sieve with an average particle diameter of less than 5 microns treated by colloid mill, and 4198 g of deionized water was added to the reactor. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst according to the present disclosure was obtained. This catalyst was recorded as catalyst A7.

The sprayed slurry of catalyst A7 had a solid content of 31.8 wt % and a viscosity of 2589 centipoise. The obtained A7 catalyst had an abrasion index of 1.3, a pore volume of 0.35 $mL \cdot g^{-1}$ and a micro-reactivity of 72.

Example 8

Quantities of 5080 g of deionized water and 2078 g of kaolin were introduced into a reactor. After beating for 10 minutes, 230 g of hydrochloric acid with a concentration of 35% was added. After mixing to make homogeneous, 1656 g of 1# pseudoboehmite was added under stirring. After 30 minutes of stirring, 125 g of water glass with a concentration of 21% (calculated for the $SiO_2$) was introduced into the reactor. Following 10 minutes of agitation, molecular sieve slurry comprising 2060 g of REUSY molecular sieve with an average particle diameter of less than 5 microns treated by colloid mill and 3730 g of deionized water was added. After 30 minutes of further agitation, 89 g of sodium pyrophosphate as dispersant, 2174 g of aluminum collosol were added. After beating for 30 minutes, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst according to the present disclosure was obtained. This catalyst is recorded as catalyst A8.

The sprayed slurry of catalyst A8 had a solid content of 29.2 wt % and a viscosity of 2056 centipoise. The obtained A8 catalyst had an abrasion index of 1.5, a pore volume of 0.40 $mL \cdot g^{-1}$ and a micro-reactivity of 81.

Example 9

The deionized water, 2174 g of aluminum collosol and 200 g of hydrochloric acid with a concentration of 35% were introduced into a reactor. After mixing to make homogeneous, 2078 g of kaolin was added. After 30 minutes of stirring, a molecular sieve slurry comprising 1937 g of REUSY molecular sieve, 123 g of Fudan ZSN-5 molecular sieve and deionized water was added to the reactor. Following agitation for 1 hour, 1656 g of 1# pseudoboehmite was added. After stirring for 30 minutes, 89 g of DAP as a dispersant was added. Following another agitation of 1 hour, spray drying was conducted to obtain catalyst microspheres. The obtained catalyst microspheres were torrefied at 500° C. for 30 minutes, the deionized water was added, and the mixture was stirred to make homogeneous. After a 15 minute wash at 80° C. followed by filtration and drying, an FCC catalyst according to the present disclosure was obtained. This catalyst was recorded as catalyst A9.

The sprayed slurry of catalyst A9 had a solid content of 40.4 wt % and a viscosity of 4632 centipoise. The obtained A9 catalyst had an abrasion index of 1.7, a pore volume of 0.41 mL·$g^{-1}$ and a micro-reactivity of 79.

Example 10

The deionized water, 2174 g of aluminum collosol and 200 g of hydrochloric acid with a concentration of 35% were introduced into a reactor. After mixing to make homogeneous, 2078 g of kaolin was added. After 30 minutes of stirring, 1656 g of 1# pseudoboehmite and a dispersant of 32 g phosphoric acid were added to the reactor. After agitating for 1 hour, a molecular sieve slurry comprising 1937 g of REUSY molecular sieve, 123 g of Fudan ZSN-5 molecular sieve and deionized water was added. After further agitation for 1 hour, 89 g of DAP as a dispersant was added. Following another agitation of 0.5 hour, spray drying was conducted to obtain catalyst microspheres. The obtained catalyst microspheres were torrefied at 500° C. for 30 minutes, the deionized water was added, and the mixture was stirred to make homogeneous. After a 15 minute wash at 80° C. followed by filtration and drying, an FCC catalyst according to the present disclosure was obtained. This catalyst was recorded as catalyst A10.

The sprayed slurry of catalyst A10 had a solid content of 38.4 wt % and a viscosity of 4927 centipoise. The obtained A10 catalyst had an abrasion index of 1.5, a pore volume of 0.39 mL·$g^{-1}$ and a micro-reactivity of 80.

Comparative Example 4

This comparative example shows the practical effect of the dispersant being absent during the process of preparing the catalyst with high solid content.

The deionized water, 2174 g of aluminum collosol and 200 g of hydrochloric acid with a concentration of 35% were introduced into a reactor. After mixing to make homogeneous, 2078 g of kaolin was added. After 30 minutes of stirring, 1656 g of 1# pseudoboehmite was added. After an agitation of 1 hour, a molecular sieve slurry comprising 1937 g of REUSY molecular sieve, 123 g of Fudan ZSN-5 molecular sieve and deionized water was added. After another agitation of 1 hour, spray drying was conducted to obtain catalyst microspheres. The obtained catalyst microspheres were torrefied at 500° C. for 30 minutes, the deionized water was added, and the mixture was stirred to make homogeneous. After a 15 minute wash at 80° C. followed by filtration and drying, an FCC catalyst was obtained. This catalyst was recorded as catalyst B4.

The sprayed slurry of catalyst B4 had a solid content of 38.4 wt % and a viscosity of 8627 centipoise. The obtained B4 catalyst had an abrasion index of 2.4, a pore volume of 0.38 mL·$g^{-1}$ and a micro-reactivity of 79. The experimental data shows that when the dispersant was not added during the process of preparing the B4 catalyst, the B4 catalyst slurry had an increased viscosity and a less desirable fluidity.

Comparative Example 5

This comparative example shows the practical effect from a conventional process for preparing semi-synthesized FCC catalyst wherein the pseudoboehmite and aluminum collosol are used as a composite binder.

Quantities of 6060 g of deionized water and 2078 g of kaolin were introduced into a reactor equipped with a heating jacket. After beating for 20 minutes, 1656 g of 1# pseudoboehmite was added. After beating for 30 minutes, 220 g of hydrochloric acid with a concentration of 35% was added. Following 30 minutes of stirring, the temperature was elevated to 70° C. for aging for 1 hour, and then 2174 g of aluminum collosol was added under agitation. After 15 minutes of beating, a molecular sieve slurry comprising 1937 g of REUSY molecular sieve with an average particle diameter of less than 5 microns treated by colloid mill, 123 g of Fudan ZSN-5 molecular sieve and 3510 g of deionized water was added. After beating for 0.5 hour, spray drying was conducted to obtain catalyst microspheres. The obtained catalyst microspheres were torrefied at 500° C. for 30 minutes, an 8-fold volume of deionized water was added, and the mixture was stirred to make homogeneous. After a 15 minute wash at 80° C. followed by filtration and drying, an FCC catalyst was obtained. This catalyst was recorded as catalyst B5.

The sprayed slurry of catalyst B5 had a solid content of 28.2 wt % and a viscosity of 6752 centipoise. The obtained B5 catalyst had an abrasion index of 1.5, a pore volume of 0.36 mL·$g^{-1}$ and a micro-reactivity of 79. Because the viscosity of the B5 slurry is too high, this process is not a practical process for production of a catalyst slurry with high solid content.

Reviewing the experimental results from Examples 1-10 and Comparative Examples 1-5, it is observed that the method according to the present disclosure may be used to effectively increase the solid content of FCC catalyst slurry. The catalyst obtained by the disclosed method maintains a high pore volume and high micro-reactivity, while simultaneously having a relatively low anti-friction index.

The A1 catalyst prepared according to the present disclosure and comparative catalysts B1 and B3 were used in a fixed fluidized bed. The results are tabulated in Table 2. The said fixed fluidized bed had a reaction temperature of 500° C., a catalyst-oil ratio of 4; a space velocity of 15 $h^{-1}$; and the stock oil was that of Xinjiang oil blend with 30% vacuum residue.

TABLE 2

Evaluation Results Of Catalyst Used With Fixed Fluidized Bed

| Test No.<br>Catalyst | Example 1<br>A1 | Comparative<br>Example 1<br>B1 | Comparative<br>Example 3<br>B3 |
|---|---|---|---|
| Abrasion index, % | 1.5 | 2.7 | 3.3 |
| Pore volume, mL · $g^{-1}$ | 0.40 | 0.40 | 0.41 |
| Micro-reactivity, % | 79 | 77 | 76 |
| Dry gas, % | 1.78 | 1.81 | 1.80 |
| Liquefied gas, % | 16.17 | 16.07 | 15.91 |
| Gasoline, % | 48.64 | 48.10 | 48.30 |
| Diesel oil, % | 17.32 | 17.42 | 17.13 |
| Heavy oil, % | 7.90 | 8.38 | 8.58 |
| Chark, % | 8.03 | 8.00 | 8.15 |
| Total, % | 99.84 | 99.78 | 99.87 |
| Rate of conversion, % | 74.63 | 73.98 | 74.16 |
| Total liquid yield, % | 82.14 | 81.59 | 81.30 |
| Light oil yield, % | 65.96 | 65.52 | 65.43 |
| Gasoline olefinicity, v % | 13.43 | 15.13 | 15.29 |
| MON | 81.6 | 81.4 | 81.7 |
| RON | 91.5 | 91.9 | 91.6 |

From the results in Table 2, it is apparent that, compared with catalysts B1 and B3 prepared by the comparative methods, inventive catalyst A1 prepared by the method according to this disclosure exhibited the best capacity for heavy oil conversion as well as the highest total liquid yield. The gasoline produced using the inventive A1 catalyst has lower olefinic content than the conventionally-prepared catalysts. The overall reactivity of the A1 catalyst is improved relative to catalysts B1 and B3.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method for increasing the solid content of catalytic cracking catalyst slurry, comprising making catalyst slurry by mixing to make homogeneous a clay, molecular sieve slurry, aluminum-containing binder, a pseudoboehmite, and an inorganic acid, said method comprising: (1) adding the inorganic acid before the addition of pseudoboehmite, and adding the molecular sieve after the addition of inorganic acid, wherein the weight ratio between the inorganic acid and the aluminum oxide in pseudoboehmite is 0.01-0.08; and (2) adding a phosphorus-containing dispersant into the process, wherein the dispersant is a phosphoric acid and/or phosphate added in an amount of from about 0.05% to about 6% based on the dry weight basis of the catalyst.

2. The method according to claim 1 wherein the inorganic acid is added after the addition of clay and aluminum-containing binder.

3. The method according to claim 1 wherein inorganic acid and aluminum-containing binder are combined and mixed to make homogeneous prior to addition of the other components.

4. The method according to claim 1 wherein the phosphorus-containing dispersant is selected from one or more of diammonium hydrogen phosphate, phosphoric acid, sodium hexametaphosphate, sodium pyrophosphate and combinations thereof.

5. The method according to claim 1 wherein the phosphorus-containing dispersant is added in an amount of from about 0.1% to about 4%.

6. The method according to claim 1 wherein, based on the dry basis by weight of the catalyst slurry, the catalyst slurry comprises from about 15% to about 50% of molecular sieve, from about 15% to about 60% of clay, from about 8% to about 30% of pseudoboehmite, and from about 3% to about 18% of aluminum-containing binder according to aluminum oxide.

7. The method according to claim 1 wherein the catalyst slurry further comprises between 0% and about 8 wt % of at least one oxide or precursor of an oxide selected from the group consisting of rare earth oxides, zinc oxide, silicon oxide, magnesia, titanium oxide, vanadium oxide, copper oxide, precursors thereof, and combinations thereof.

8. The method according to claim 7 wherein the catalyst slurry comprises at least one oxide or precursor of an oxide selected from rare earth oxides, silicon oxide, precursors thereof and combinations thereof.

9. The method according to claim 1 wherein the molecular sieve is selected from the group consisting of Y-type zeolites and mixtures of at least one Y-type zeolite with at least one zeolite selected from the group consisting of ZSM zeolite, .beta. zeolite, .OMEGA. zeolite, MCM zeolite, SAPO zeolite, and combinations thereof.

10. The method according to claim 1 wherein the molecular sieve comprises a mixture of Y-type zeolite and ZSM-5 zeolite.

11. The method according to claim 9 wherein the Y-type zeolite is a modified Y-type zeolite.

12. The method according to claim 11 wherein the Y-type zeolite is selected from the group consisting of HY, NH.sub.4Y, REY, USY, REUSY, and combinations thereof.

13. The method according to claim 1 wherein the clay is selected from the group consisting of kaolin, meerschaum, allokite, polynite, and combinations thereof.

14. The method according to claim 13 wherein the clay is selected from the group consisting of kaolin, allokite and mixtures thereof.

15. The method according to claim 14 wherein the clay comprises kaolin.

16. The method according to claim 1 wherein the pseudoboehmite is selected from the group consisting of boehmite, hydrargillite, bayerite, and combinations thereof.

17. The method according to claim 16 wherein the pseudoboehmite comprises boehmite.

18. The method according to claim 1 wherein the inorganic acid is selected from the group consisting of hydrochloric acid, sulfuric acid, nitric acid, and phosphoric acid.

19. The method according to claim 18 wherein the inorganic acid is hydrochloric acid.

20. The method according to claim 1 wherein the aluminum-containing binder is selected from the group consisting of aluminum collosol, aluminum chlorhydroxide, acid modified kaolin, and combinations thereof.

21. The method according to claim 1 wherein the aluminum-containing binder is selected from the group consisting of: (1) aluminum-containing binders obtained from the reaction of metallic aluminum with hydrochloric acid or aluminum chloride; (2) aluminum-containing binders obtained from the pyrolysis process of crystalline aluminum chloride; (3) aluminum-containing binders obtained from the reaction of inorganic acid with kaolin or torrefied kaolin; and (4) aluminum-containing binders obtained from the reaction of hydrochloric acid and aluminum hydroxide under elevated pressure.

22. A catalytic cracking catalyst slurry prepared by the method according to any one of claims 1, 6, or 7.

* * * * *